June 25, 1963  H. M. VALENTINE ETAL  3,095,244
BRAKE SYSTEM AND CONTROL VALVE THEREFOR
Filed July 14, 1960  2 Sheets-Sheet 2
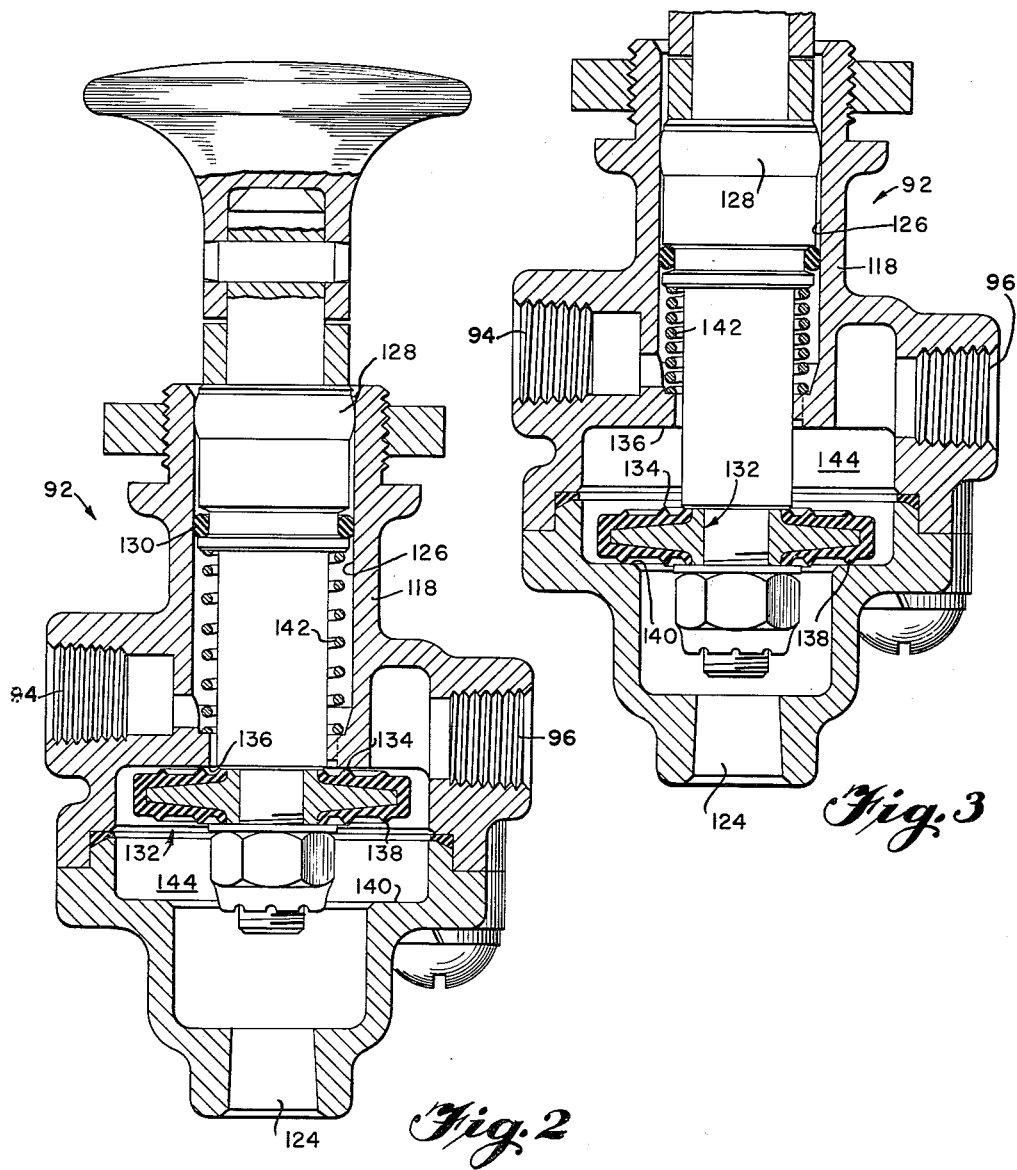
INVENTORS
Harry M. Valentine and
Earl T. Andrews
BY Scrivener & Parker
ATTORNEYS United States Patent Office 3,095,244
Patented June 25, 1963

3,095,244
BRAKE SYSTEM AND CONTROL VALVE THEREFOR
Harry M. Valentine, Elyria, and Earl T. Andrews, Lorain, Ohio, assignors to Bendix-Westinghouse Automotive Air Brake Company, Elyria, Ohio, a corporation of Delaware
Filed July 14, 1960, Ser. No. 42,876
4 Claims. (Cl. 303—9)

This invention relates to compressed air operated brake systems for vehicles and more particularly to systems including one or more spring actuators for applying the brakes through the action of a spring under certain conditions.

One of the principal objects of the present invention is to provide a novel safety brake construction for vehicles equipped with a conventional compressed air braking system, which is so constituted as to automatically and mechanically apply the brakes in the event that the system pressure drops below a predetermined value.

A further object is to provide a novel safety brake construction wherein the vehicle operator must be in the cab of the vehicle in order to operate certain valve devices for the purpose of releasing the brakes of a parked vehicle.

Another object is to provide in an arrangement of the above character a novel construction wherein springs are employed for automatically applying the brakes when the system pressure drops below a predetermined pressure and wherein the springs may be released through operator-controlled devices when the system pressure is increased to a predetermined pressure sufficiently high to permit the vehicle to safely proceed under the control of the compressed air braking system.

Still another object includes the incorporation of the safety spring actuators in a compressed air braking system in a novel manner so as to permit relatively simple installation in conventional air brake systems in order to retain all of the desirable operating characteristics of such systems.

A still further object is to arrange the safety spring actuators in the system in such a manner as to avoid the possibility of simultaneously applying the brakes by the spring actuators and by the conventional service brake chambers, which would otherwise subject the brake operating arms and linkages to excessive brake-applying forces.

A still further object is to provide a novel control valve construction for a system of the above type, which is automatically operable to allow the safety spring brake actuators to apply the brakes when the system pressure drops to a predetermined value, and which is also manually operable at any time in order to apply the spring brakes for parking or for emergency operation.

Another object includes the provision of a novel valve of the above type which comprises relatively few parts and which may be readily connected in existing types of conventional air brake systems.

The above and further objects of the invention will appear more fully hereinafter from a consideration of the following detailed description when taken in connection with the accompanying drawings which disclose one form of the invention. It will be expressly understood, however, that the drawings are employed for purposes of illustration only and are not to be taken as a definition of the limits of the invention, reference being had for this purpose to the appended claims.

Referring to the drawings wherein similar reference characters refer to similar parts throughout the several views:

FIG. 2 is an axial sectional view of a control valve for use in the system of FIG. 1, the valve being shown in open or emergency position; and FIG. 3 is a partial view in section of the valve of FIG. 2 shown in closed or released position.

Figure 1:
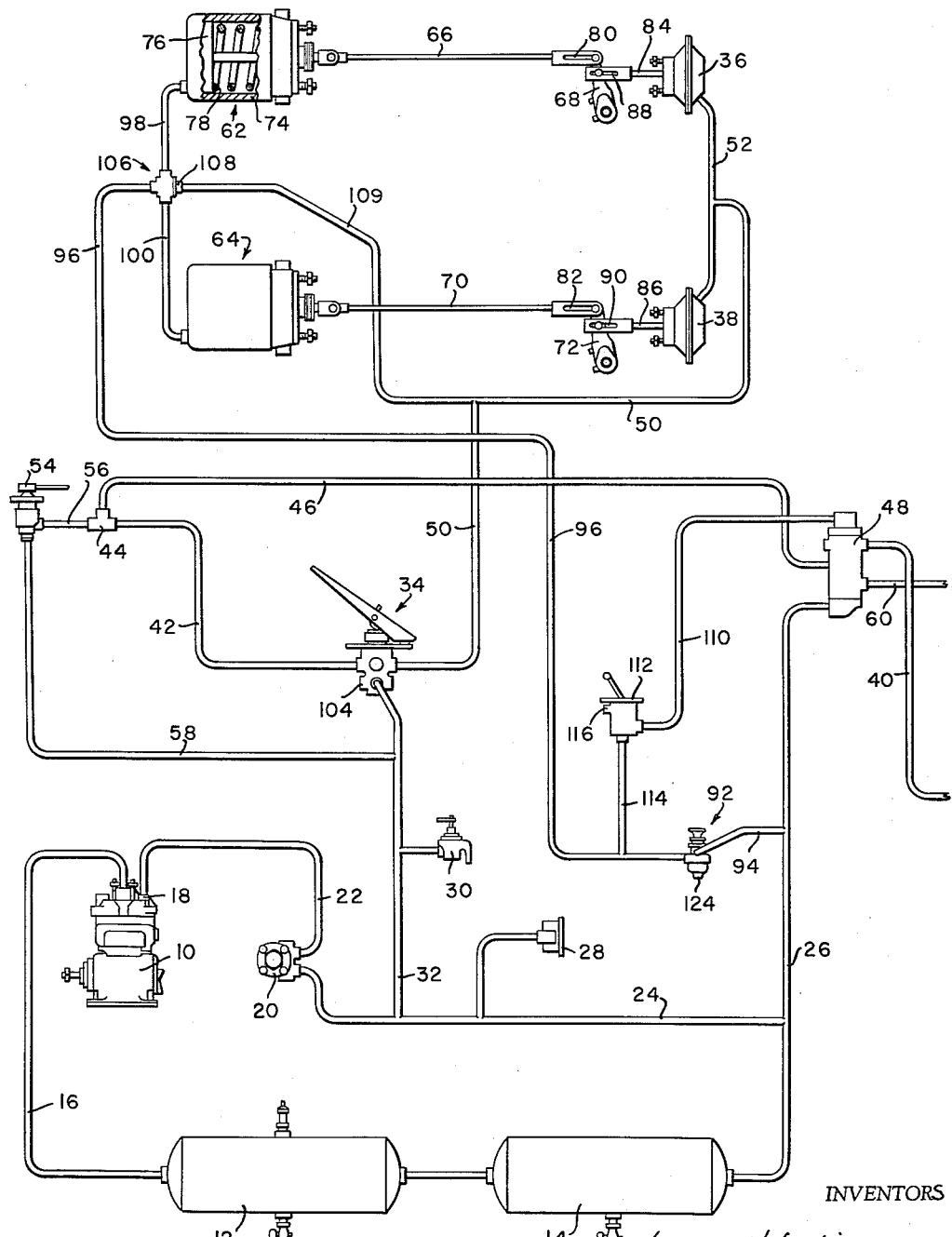
FIG. 1 is a diagrammatic view of a safety brake system embodying the features of the present invention.

The novel safety brake system of the present invention is illustrated in FIG. 1 in connection with a conventional type of air brake system for use on tractor vehicles. More particularly, the system includes a compressor 10, for supplying compressed air to series-connected reservoirs 12 and 14 through a conduit 16, the compressor having the usual unloader 18 controlled by a conventional governor 20 through conduits 22 and 24 connected with an outlet or tractor emergency conduit 26. A suitable pressure gage 28 is connected with the conduit 24 and a conventional low pressure indicator 30 is connected with a conduit 32 inter-connecting conduit 24 with a manually operable self-lapping brake valve 34 which may be of any suitable type. Brake valve 34 may be provided with two outlet conduits for applying the service brake chambers 36 and 38 on the tractor and for charging the trailer service conduit 40 to apply the trailer brakes in service. As shown, conduit 42 is connected with conduit 40 through a double check valve 44 of conventional construction, a conduit 46 and a tractor protection valve 48 which may be constructed as shown in the patent to Earl T. Andrews No. 2,850,330 dated September 2, 1958. It will be understood by those skilled in the art that valve 48 is for the purpose of conserving in the tractor brake system a predetermined air pressure in the event of leakage in the trailer brake system or a break-in-two of the connected vehicles. Outlet conduit 50 is connected with conduit 52 which in turn is connected with the brake chamber 38 and with brake chamber 36, it being obvious that due to the connections just described, application of the brake valve 34 will simultaneously charge the conduits 42, 50 and 52 to apply the trailer and tractor brakes in service. If desired, a hand operated brake valve 54 of conventional construction may be connected to the double check valve 44 and the conduit 32 by means of conduits 56 and 58, such valve enabling the operator to charge the conduits 46 and 40 to apply the brakes on the trailer at any time that such valve is moved to a position to connect conduits 56 and 58. Normally the valve 54 occupies a position where communication between conduits 56 and 58 is interrupted. Tractor emergency conduit 26 is connected with trailer emergency conduit 60 through the tractor protection 48.

The novel safety brake actuators and control valve of the present invention are interconnected and associated with the above-described conventional vehicle air brake system in order to provide a relatively simple but highly efficient combined spring operated and compressed air controlled brake system. As shown, the invention includes a pair of spring actuators 62 and 64 of similar construction, actuator 62 being connected through a piston rod 66 with the brake applying arm or slack adjuster 68 while the actuator 64 is connected through a piston rod 70 with the brake applying arm or slack adjuster 72. Actuators 62 and 64 include a chamber or cylinder 74 in which a piston 76 is slideably mounted, the latter being rigidly connected with the piston rod 66. A spring 78 constantly tends to move the piston 76 toward the left, as viewed in FIG. 1, to apply the brake through the rod 66, and does apply the brake when the air pressure in the brake system drops to a predetermined pressure as for example, 40 p.s.i. As illustrated in FIG. 1, the spring actuators 62 and 64 are illustrated in applied position and it is assumed that no pressure is present in the system. Under these conditions, piston rods 66 and 68 are moved toward the left to apply the brakes through the pin and slot connections 80 and 82. It will be understood that during such brake applying movement of the arms 68 and 72, no movement of brake rods 84 and 86 respectively associated with brake chambers 36 and 38 will occur, due to pin and slot connections 88 and 90. With the above arrangement, it will be understood that whenever the actuators 62 and 64 occupy the position illustrated in FIG. 1, the tractor brakes are applied by spring action.

Novel means are employed by the present invention in order to control the spring actuators 62 and 64. As shown, such means includes a two-position control valve 92, to be described hereinafter in detail, which in one position is adapted to conduct reservoir pressure from the conduit 26 to the spring actuators 62 and 64 to the left of the pistons 76 therein by way of supply conduit 94 and conduits 96, 98 and 100. Under these conditions, as soon as the pressure admitted to actuators 62 and 64 reaches a predetermined pressure, as for example about 40 p.s.i., pistons 76 will be moved to compress the springs 78 and release the brakes.

In the other position of the control valve 92, the supply conduit 94 is shut off and the conduit 96 is connected to atmosphere through an exhaust 124 of valve 92 to permit application of the brakes by means of the spring actuators 62 and 64. Conduits 98 and 100 are connected through a quick release valve 106 of well known construction such as for example, as shown in the patent of Earl T. Andrews No. 2,718,897 dated September 27, 1955. Such valves include an exhaust connection 108 which automatically would vent the conduits 98 and 100 whenever the pressure in conduit 96 drops to a value slightly lower than that in the conduits 98 and 100. In the form shown, the exhaust 108 is connected through a conduit 109 with the outlet or service conduit 50. With such an arrangement, fluid pressure may be conducted to the spring brake actuators by way of conduit 96 or by way of conduit 109 depending upon which pressure is greater, the valve 106 thus functioning as a selectively operable valve.

As will appear more fully hereinafter, valve 92 may be manually moved to the two positions referred to above. Such valve is also constructed as to be automatically movable from the said one to the said other position to automatically permit spring brake actuation whenever the system pressure in supply conduit 94 drops to a predetermined pressure of approximately 40 p.s.i. Thus the invention provides an effective safety system for automatically and mechanically applying the tractor brakes whenever the system pressure drops below a value where it would be unsafe to operate the vehicle and to rely on air braking alone.

The system of FIG. 1 also includes a control line 110 for the tractor protection valve 48 which is connected with the conduit 96 through a trailer two-way control valve 112 and conduit 114. Such valve is of conventional construction and arranged so that in normal position, compressed air may flow from the conduit 96 to the control chamber of valve 48. When the valve is normally moved to emergency position however, such flow is interrupted and the control line 110 is vented to atmosphere via an exhaust port 116 in the valve 112 in order to allow the tractor emergency line 60 to be vented to atmosphere through the valve 48 and thus permit a compressed air emergency brake application on the trailer. Such an emergency trailer application would also occur with the valve 112 in the normal position should the conduit 96 be vented to atmosphere via control valve 92 and the exhaust 102. Under such conditions, the tractor brakes would also be automatically applied by the spring brake actuators 62 and 64 as above set forth.

Referring more particularly to FIGS. 2 and 3, the novel two-position control valve 92 is illustrated therein as including a casing 118 provided with inlet and outlet ports respectively connected with conduits 94 and 96, and an exhaust port 124. Casing 118 is also provided with a bore 126 for slideably receiving a valve plunger 128 having an O-ring seal 130. The lower end of the plunger 128 carries a valve member 132 of rubbery material having an inlet valve on its upper face and an exhaust valve on its lower face. The inlet valve is constituted by an annular bead 134 adapted to contact a face 136 of the casing 118 while the exhaust valve is formed by an annular bead 138 adapted to contact a face 140 as shown in FIG. 3. A spring 142 is confined between a portion of the casing 118 and the plunger 128 and constantly tends to urge the plunger upwardly to maintain the inlet valve 134 closed. When closed, the area of the annular bead 136 is less than the area of the ring 130 so that when the valve 92 is in the closed or emergency position of FIG. 2, the valve will remain in such position even though the pressure at the port 120 rises to full reservoir pressure. The valve may however, be manually moved to the position shown in FIG. 3, in which event it will remain in such position provided the pressure within chamber 144 above the valve 132 is above the minimum pressure of approximately 40 p.s.i. This is due to the area of the exhaust valve bead 140 which is considerably larger than the bore 126. Hence the valve 132 is pressure responsive by reason of the pressure acting on the upper surface thereof over the area of the bead 140 to maintain the valve closed against the force effective on the ring 130 and the force of the spring 142 until the fluid pressure in the chamber drops to the minimum value, whereupon the spring 142 moves the valve to the position of FIG. 2.

In operation, it is assumed that in FIG. 1, there is no air pressure in the system and that the spring brake actuators 62 and 64 are in the position shown so that the vehicle brakes are applied by the action of the springs 78. Valve 92 is in the emergency or open position of FIG. 2 where the conduit 96 is connected with the exhaust 124 in order to vent the conduit 96 to atmosphere. Under these conditions conduits 109, 50, 98 and 100 are also vented to the atmosphere through the exhaust port 104 of the brake valve 34. Inlet valve 134 is closed and will remain closed until manually moved, regardless of the build-up of pressure in conduit 94, as heretofore described.

Under the above conditions, operation of the compressor 10 will charge the reservoirs 12 and 14 as well as conduits 24, 32 and 94 to full reservoir pressure. The operator, who must be in the vehicle cab, may now operate the brake valve 34 which simultaneously charges conduits 50 and 52 as well as conduit 109, quick release valve 106, conduits 98 and 100 and spring brake actuators 62 and 64. Charging of service brake chambers 36 and 38 will then gradually apply the brakes through the slack adjusters 68 and 72 as the effect of the spring brake actuators 62 and 64 on the slack adjusters is gradually released. Thus, the slack adjusters and brake parts are not simultaneously subjected to the combined action of the spring brake actuators and the service brake chambers which otherwise would result in excessive forces being applied to the brake parts.

As soon as the pressure within the actuators 62 and 64 has built up to a value above the minimum value of approximately 40 p.s.i. to effect a release of the spring brake application, the operator may manually move the valve 92 from the position of FIG. 2 to that of FIG. 3 whereupon full reservoir pressure will be conducted to the actuators 62 and 64 by way of conduit 26, valve 92, conduit 96, quick release valve 106 and conduits 98 and 100, and valve 92 will remain in such position as heretofore described. Valve 92 thus effectively "locks" reservoir pressure in the actuators 62 and 64 in order to maintain them in released position after they have been released by operation of the brake valve.

The vehicle may then be operated in the same manner as any vehicle equipped with a conventional air brake system. The valve 92 may be manually moved to its emergency position of FIG. 2 at any time, as for example, when it is desired to park the vehicle. When this occurs conduit 96 is connected with the exhaust port 124 and the spring brake actuators are vented to atmosphere through the brake valve as heretofore described.

It will also be recalled that in the event the system pressure drops to a minimum value of approximately 40 p.s.i., the valve 92 will automatically move to the position of FIG. 2 to cause a spring brake operation. In either of the above events, the spring brake actuators may be released by operation of the brake valve 34 as heretofore described, provided the system pressure is above the minimum value.

Should the pressure in the system be less than the minimum value, the spring brake actuators will remain in applied position and the operator will be apprised that some leakage exists and repairs must be made. During such low pressure conditions, the valve 92 will remain in the position shown in FIG. 2. Even if the operator manually pushes in on the handle 162, the valve 92 will immediately return to the emergency position since a system pressure in excess of the minimum pressure is required to maintain the valve in the position of FIG. 3.

The present invention thus provides in a conventional vehicle air brake system, a novel construction which enables a "fail safe" brake application through mechanical means in the event that the system pressure drops below a safe operating value. An effective parking brake is also secured which is independent of the air pressure in the system. The aforesaid mechanical means is disclosed as a spring brake actuator capable of fluid pressure release and such actuator has been incorporated in the system in such a manner as to be automatically operable to apply and release the brakes in a manner requiring no special operations or techniques on the part of the operator.

The two-position control valve is mounted in the vehicle cab so as to be readily operable at any time, and in conjunction with the brake valve, constitutes a convenient and efficient control for the spring brake actuators. The valve 132 of the control valve 92 in addition to being manually movable is arranged as to be responsive to reservoir or system pressure in such a manner as to maintain the spring brake actuators in released position so long as the system pressure remains above a predetermined minimum.

While a preferred form of the invention has been shown and described herein with considerable particularity, it will be understood by those skilled in the art that a wide variety of changes may be made therein without departing from the spirit of the invention. Reference will therefore be had to the appended claims for a definition of the limits of the invention.

What is claimed is:

1. A vehicle fluid valve brake system having a source of fluid pressure, a fluid pressure actuator for normally applying a vehicle brake, a spring operated fluid pressure released actuator for mechanically applying the brake when the fluid pressure from said source is below a predetermined pressure, a manually operable valve having an inlet port connected with said source, an outlet port and an exhaust port connected to atmosphere, means including a selectively operable valve for connecting said outlet port with said spring operated actuator, said valve also having a manually movable valve element movable to one position to connect said inlet and outlet ports and movable to a second position to connect said outlet and exhaust ports, a manually operable brake valve movable to connect said source and fluid pressure actuator, and means to connect said source through said brake valve and said selectively operable valve with said spring operated actuator when the brake valve is moved to supply fluid from the source to the fluid pressure actuator and after said manually operable valve is moved to said second position.

2. The system as set forth in claim 1 wherein said valve element is maintained in said one position as long as the pressure at said source is above said predetermined value.

3. A vehicle fluid pressure brake system having a source of fluid pressure, a fluid pressure actuator for normally applying a vehicle brake, a spring operated fluid pressure released actuator for mechanically applying the brake when the fluid pressure from said source is below a predetermined pressure, a first manually operable valve having an inlet connected with the source, an outlet, and an exhaust port connected to atmosphere, means including a selectively operable valve for connecting the outlet with the spring operated actuator, said first valve being movable to one position to connect said inlet with said outlet for connecting the source with said spring operated actuator to effect brake releasing operation thereof when the pressure from said source is above said predetermined pressure and movable to another position to connect said outlet with the exhaust port, a second manually operable valve, a connection between said source and said second valve, and a connection between said second valve and said selectively operable valve, the second valve being movable to connect said source with said spring operated actuator to effect brake releasing operation of the spring operated actuator when the pressure from said source is above said predetermined pressure and when said first named valve is moved to said another position, and means for connecting said source with said fluid pressure actuator when said second valve is moved to connect the source with the spring operated actuator.

4. The system as set forth in claim 3 wherein said first valve includes a pressure responsive member subjected to the pressure from said source when said first valve is moved to said one position to maintain said first valve in said one position so long as the fluid from said source remains at a pressure above said predetermined pressure.

References Cited in the file of this patent

UNITED STATES PATENTS

| 2,353,862 | Weber | July 18, 1944 |
| 2,840,110 | Parsons | June 24, 1958 |
| 2,852,316 | Staley | Sept. 16, 1958 |
| 2,948,359 | Barrett | Aug. 9, 1960 |

FOREIGN PATENTS

| 696,395 | Germany | Sept. 20, 1940 |